Sept. 21, 1937.　　　　J. M. BIERER　　　　2,093,904
BELTING AND METHOD OF MAKING THE SAME
Filed July 6, 1936　　　　2 Sheets—Sheet 1
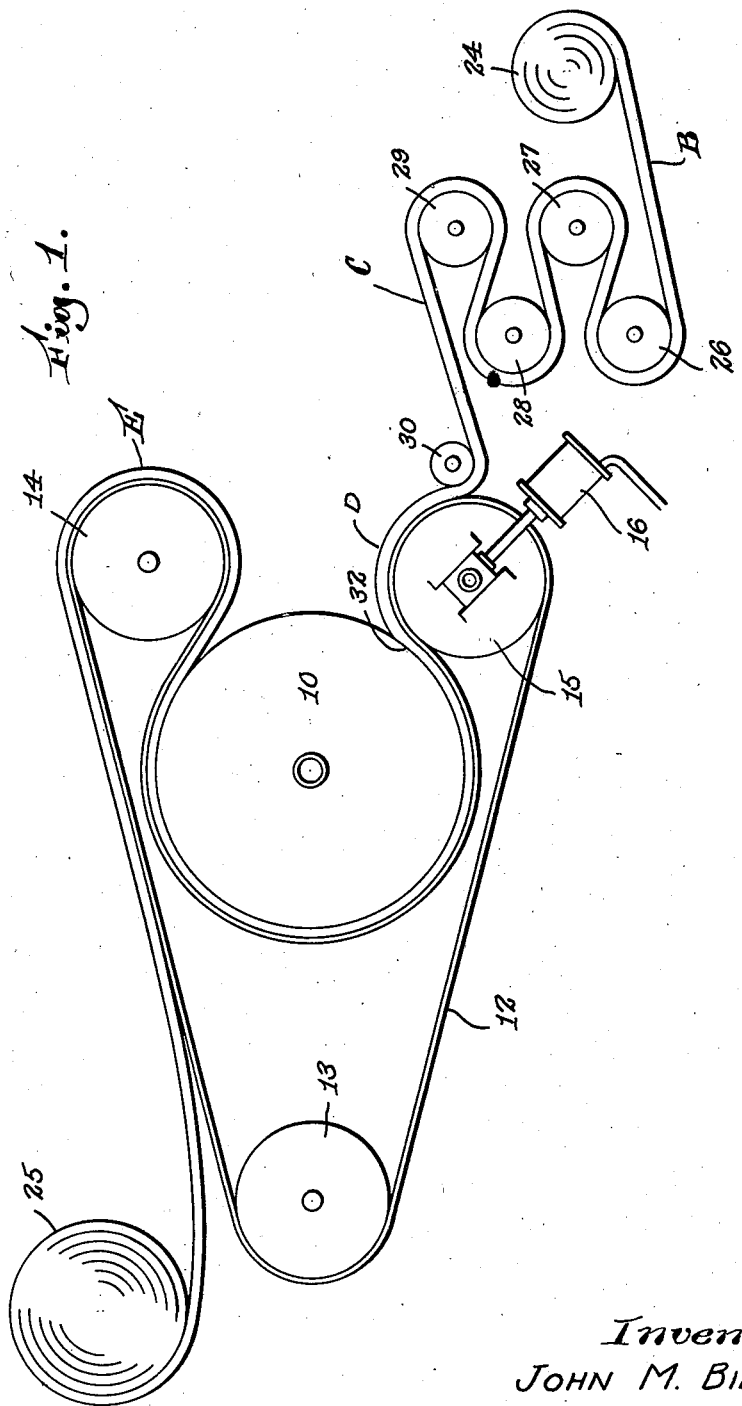
Inventor
JOHN M. BIERER
by Kenway & Witter
Attorneys

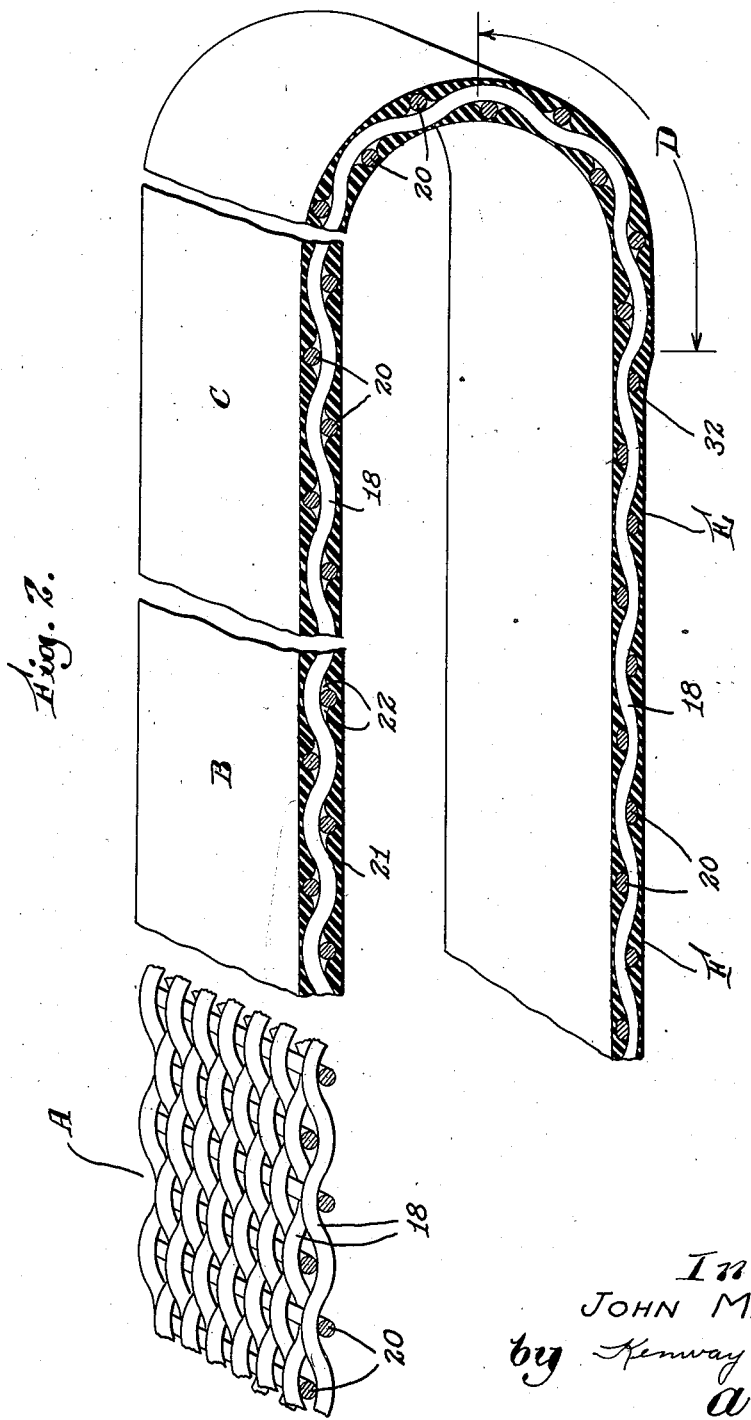

Patented Sept. 21, 1937

2,093,904

UNITED STATES PATENT OFFICE 2,093,904

BELTING AND METHOD OF MAKING THE SAME

John M. Bierer, Waban, Mass., assignor to Boston Woven Hose & Rubber Company, Cambridge, Mass., a corporation of Massachusetts Application July 6, 1936, Serial No. 88,974

9 Claims. (Cl. 18—53)

This invention relates to rubberized belting and to methods of making such belting. Heretofore belting has been most commonly cured or vulcanized by an intermittent process employing flat vulcanizing presses wherein adjoining sections of the belting are consecutively treated. By such treatment it has been impossible to produce belting of uniform character throughout its length and heretofore belting so manufactured has lacked uniformity of thickness, density, elasticity, stretch coefficient and surface appearance. The most serious defects have been at the overlapping areas of adjacent sections and these defects are due to over-vulcanization caused by the overlap vulcanizing of adjacent sections in the vulcanizing press. The excessive heat of such overlap vulcanizing chemically damages the rubber in the belting, as well as the fabric, causing the occurrence of areas which are harder or denser than the rest of the belting and it is in these areas that failures of the belting are first detected. A detrimental loss of elasticity and tensile strength also occurs in the areas of over vulcanization. The overlapping of the press at these areas also leaves objectionable press marks on the belting which detract from the appearance of the product by indicating a latent defect therein. The primary object of my invention is the production of belting in which these objections are eliminated and which is more uniform in texture, density and appearance throughout its length than any belting that it has been possible to produce by methods heretofore known.

The invention consists in belting which is not only cured continuously and therefore uniformly throughout its length, but an important feature thereof lies in the greater density of my improved belting over that of any continuously cured belting heretofore known, whereby the belting is rendered more compact and therefore stronger and of longer life. This greater density may be obtained by highly compressing the belting prior to its vulcanization and substantially retaining such compression during vulcanization, all as hereinafter described. Another feature of the invention resides in reducing the stretch in the belting preferably to a minimum by vulcanizing it while substantially stretched as well as in highly compact and compressed condition.

In the production of my improved belting the strip from which the belting is produced, such as duck impregnated and covered with rubber, is fed continuously to a heated vulcanizing drum and is pressed thereon by a continuous metal band during its passage around the drum. While such band is capable of exerting considerable pressure against the belting, my invention contemplates employing a greater pressure thereon to expel entrapped air and compact the strip into a very dense body of uniform thickness. The treatment may be carried out by any suitable mechanism and that shown in my Patents Nos. 1,987,890 and 2,039,271, wherein a severe local pressure is applied to the belting through the medium of a pressure roll bearing upon a metal band, has proven very satisfactory for the purpose. As set forth in these patents, this high compression of the strip is facilitated and the product improved by preheating the strip prior to such compression thereby rendering it more plastic. Following such high compression treatment, the metal band exerts sufficient pressure on the strip to retain it in substantially compressed condition during vulcanization thereof. While I have found that the local compression treatment suggested results in a superior product, it is possible to secure the desired results in large degree by applying an auxiliary compression to the said metal band over a considerable area thereof in contact with the vulcanizing drum, as set forth in my copending application Ser. No. 83,259, filed June 3, 1936.

An important feature of the invention, and one which cooperates in a large degree to the production of my improved product, resides in curing the belting not only under high compression, but also under a high degree of longitudinal stretch. Thus the strip is not only compressed to a high density prior to its vulcanization, but is furthermore preferably stretched a predetermined amount at relatively high tension and vulcanized while held in such stretched condition. The stretching operation may be performed by any suitable means, as for example, that illustrated in my Patent No. 1,987,890.

The present application is a continuation in part of my application Ser. No. 52,357 filed November 30, 1935.

These and other features of the invention will be understood and appreciated from the following description of a preferred embodiment thereof, selected for purposes of illustration and shown, together with one form of apparatus suitable for its manufacture, in the accompanying drawings in which, Fig. 1 is a diagrammatic view in elevation of a machine suitable for carrying out my improved method of curing belting, Fig. 2 shows, in sectional perspective, a piece of belting constructed in accordance with the method illustrated in Fig. 1.

In Fig. 1, I have shown one type of machine satisfactory for carrying out my preferred method of procedure and I shall describe the invention more particularly by reference to that illustration. Briefly the vulcanizing mechanism comprises a heated vulcanizing drum 10 about a substantial or extended arcuate portion of which extends a steel band 12, the band passing around and being supported by rolls 13, 14 and 15. The roll 15 is a pressure roll and hydraulic cylinders 16 cooperating therewith are adapted to force this roll against the band and drum with considerable pressure. The pressure roll 15 is also preferably heated thereby preheating the belting as hereinafter described.

The improved belting of my invention includes a woven textile fabric A embodying warp and filling threads 18 and 20 and this fabric is frictioned on both sides with rubber 21 to form the strip B. During the frictioning treatment the rubber impregnates and covers the fabric, air being entrapped therein to some extent and forming air pockets such for example as those designated by reference character 22. The object of my invention is so to treat and vulcanize this strip B as to form it into a continuously cured belting of stronger and more uniform character throughout its length than has been possible by methods heretofore known.

The rubber frictioned strip B is drawn from a roll 24, passes through the vulcanizing machine and the finished product is rolled into a roll 25. It is desirable that the completed belting shall be as nearly stretch-proof as possible and I therefore preferably place the strip under a substantial stretching tension during its passage to the vulcanizing drum. This tensioning may be produced by passing the strip over and in considerable surface contact with a plurality of cylindrical rolls 26, 27, 28 and 29 geared together as illustrated in my Patent No. 1,987,890, to run respectively at progressively greater surface speeds whereby progressively stretching the strip to greater and greater tension as it passes along and over the rolls, it being understood that the strip is drawn from the roll 24 and over the rolls 26—29 by the power driven drum 10. Thus the strip as drawn onto the drum 10 is in a condition of substantial stretch and tension, the amount of such stretch being determined by the nature of the fabric. The condition of the strip as thus stretched is indicated at C in Fig. 2.

The purpose of the pressure roll 15 is to place the belting under relatively high compression to render the product stronger, more compact, and of more uniform thickness. In order to facilitate this treatment, especially with relatively thick and heavy belting, I preferably preheat the belting prior to its compression by this roll to render the belting more plastic. Such preheating may be performed by passing the belting beneath an idler 30 and in surface contact with the band 12 opposite to the heated roller 15 for a substantial distance ahead of the bite between the band and vulcanizing drum. Thus as the belting reaches the bite it is sufficiently plastic to be more easily compressed by the roll 15.

The preheating of the strip is indicated at D in Fig. 2 and the compression thereof, as by the roller 15, is indicated at 32. It will be apparent that the compressing of the strip at 32 closes up the pockets 22 whereby expelling the entrapped air therefrom and causing a substantial reduction in thickness of the strip and a consequent densifying of the product, the latter being due both to the elimination of the air pockets and to a substantial compression of the fabric as illustrated at E. The strip is then vulcanized while held in stretched and compressed condition between the band 12 and the vulcanizing drum 10, the compression thereon during vulcanization being less than that exerted by the pressure roll 15 at 32, but sufficient to keep the strip substantially to the reduced thickness illustrated. The completed belting, illustrated at F, will thereafter retain a very substantial proportion of its reduction in thickness and remain in its elongated condition, and such product is obviously stronger and superior to previously constructed belting which has not been vulcanized in the highly compressed and/or stretched condition herein described.

It has been established that the compacting pressure on the belting, prior to vulcanization, should preferably approach a maximum which is limited only by a slowly increasing tendency to crush or break the fabric structure and that the amount of stretch taken out should approximate one-third of the available stretching which the belting will stand without breaking the fabric. In practice, these points have been determined by curing samples under different percentages of compression and stretch and noting the effect on the flexing life and resiliency. Beyond a certain point corresponding roughly to 175 to 200 lbs. per square inch contact pressure, for belting made of the usual commercial grades of duck, and approximately 7% to 9% stretch, the resiliency of the belting passes a maximum value and then begins to decrease, the said compacting pressure being increased for denser grades and diminished for the more open weaves of fabric. After the belting has been thus highly compressed locally at the introductory portion of the vulcanizing path and in accordance with the method illustrated in the drawings, it is thereafter held under a compression of approximately 50 lbs. per square inch during vulcanization. It should be clearly understood that the extent of the compressing and stretching treatments will depend largely upon the character of the belting being manufactured. The stretching usually varies, with different materials and different characteristics of belting, conveyor belting for example usually being stretched about 4% of its length while power transmission belting is stretched a greater amount.

The belting strip, under the high compression and practice above defined and illustrated in the drawings, is reduced in thickness approximately 25 to 30% and thereafter permanently retains approximately 60 to 80% of the reduction in thickness resulting from this compression. Such amount of compression and the belting density resulting therefrom in continuously cured belting is secured conveniently and efficiently by the method and means illustrated in the drawings and heretofore described, it being understood however, that the invention is not limited to such method and means, but may be otherwise carried out, as for example, by the method and means disclosed in my said copending application and with or without a preheating of the strip as may be required by the character of the strip being treated. Continuously cured belting obtained by other apparati and methods heretofore known cannot have the high density and therefore the superior and uniform quality of my improved belting herein described and claimed. It will furthermore be apparent that by combining with such density the feature of pre-stretching the belting prior to its vulcanization, also above described, a very superior and long life belting is obtained.

In defining my invention, I have herein referred to rubberized belting consisting of woven textile fabric impregnated and covered with rubber and I desire it to be understood that I mean such definition to include all the so-called frictioned belts which are passed through a frictioning calender before placing the plies together to form the belt, the so-called skim-coated belts which have an additional layer of rubber skimmed on after the frictioning process but before plying, and the so-called rubber covered belts, such as conveyor belts, which are protected on the outside by a complete envelope of rubber. The preferred embodiment of my invention has been herein specifically illustrated and described but the scope of the invention is set forth in the following claims.

Having thus described my invention, what I claim as new and desire to secure by Letters Patent of the United States is:—

1. A method of curing rubberized belting, which consists in continuously passing a strip of woven textile fabric impregnated and covered with rubber to and along a vulcanizing path, stretching the strip longitudinally a predetermined amount at relatively high tension during its passage to said path, compressing the stretched strip in heated condition sufficiently to expel entrapped air therefrom and densify the strip and substantially reduce the thickness thereof at said vulcanizing path, and vulcanizing the strip during its passage along such path while retaining the strip substantially in said stretched and compressed condition.

2. A method of curing rubberized belting, which consists in continuously passing a strip of woven textile fabric impregnated and covered with rubber to and along a vulcanizing path, stretching the strip longitudinally a predetermined amount at relatively high tension during its passage to said path, compressing the stretched strip locally at the introductory portion of said path sufficiently to expel entrapped air therefrom and densify the strip and substantially reduce the thickness thereof, and vulcanizing the strip during its passage along such path while retaining the strip substantially in said stretched and compressed condition.

3. A method of curing rubberized belting, which consists in continuously passing a strip of woven textile fabric impregnated and covered with rubber to and along a vulcanizing path, severely stretching the strip longitudinally a predetermined amount during its passage to said path, preheating the stretched strip, compressing the preheated and stretched strip locally at the introductory portion of said path sufficiently to expel entrapped air therefrom and densify the strip and substantially reduce the thickness thereof, and vulcanizing the strip during its passage along such path while retaining the strip substantially in said stretched and compressed condition.

4. A method of curing rubberized belting, which consists in continuously passing a strip of woven textile fabric impregnated and covered with rubber to and along a vulcanizing path, stretching the strip longitudinally a substantial and predetermined amount and preheating the strip during its passage to said path, compressing the stretched and preheated strip locally at the introductory portion of said path sufficiently to expel entrapped air therefrom and densify the strip and substantially reduce the thickness thereof, and vulcanizing the strip during its passage along such path while retaining the strip substantially in said stretched and compressed condition.

5. A method of curing rubberized belting, which consists in continuously passing a strip of woven textile fabric impregnated and covered with rubber to and along a vulcanizing path, stretching the strip longitudinally during its passage to said path an amount approximating one-third its available stretching limit without breaking the fabric, compressing the stretched strip sufficiently to expel entrapped air therefrom and densify the strip and substantially reduce the thickness thereof at said vulcanizing path, and vulcanizing the strip during its passage along such path while retaining the strip substantially in said stretched and compressed condition.

6. A method of curing rubberized belting, which consists in continuously passing a strip of woven textile fabric impregnated and covered with rubber to and along a vulcanizing path, stretching the strip longitudinally a predetermined amount during its passage to said path, compressing the stretched strip an amount reducing its thickness approximately 25% at said path, and vulcanizing the strip during its passage along such path while retaining the strip substantially in said stretched and compressed condition.

7. A method of curing rubberized belting, which consists in continuously passing a strip of woven textile fabric impregnated and covered with rubber to and along a vulcanizing path, stretching the strip longitudinally approximately 7% of its length during its passage to said path, compressing the stretched strip sufficiently to expel entrapped air therefrom and densify the strip and substantially reduce the thickness thereof at said path, and vulcanizing the strip during its passage along such path while retaining the strip substantially in said stretched and compressed condition.

8. A rubberized belt continuously cured under tension and compression between moving surfaces and comprising woven textile fabric impregnated and covered with rubber and characterized by the fact that any section of the belt taken at random at any point throughout the belt possesses the same characteristics as any other section, having the same uniform thickness, high density and degree of cure, and having the same initial elongation of not less than 4% in length, whereby the belt is rendered substantially stretch-proof in use, both surfaces of every section being of a smooth uniform texture and free from press marks.

9. A rubberized belt continuously cured under high longitudinal tension in a heated and compressed condition between moving surfaces and comprising woven textile fabric impregnated and covered with rubber and characterized by the fact that any section of the belt taken at random at any point throughout the belt possesses the same characteristics as all other sections, having the same uniform thickness, high density and degree of cure, and having a predetermined uniform and substantial initial elongation, whereby the belt is rendered substantially stretch-proof in use, both surfaces of every section being of the same smooth uniform texture and free from press marks.

JOHN M. BIERER.